United States Patent
Rudoff (10) Patent No.: US 7,185,032 B2
(45) Date of Patent: Feb. 27, 2007

(54) MECHANISM FOR REPLICATING AND MAINTAINING FILES IN A SPACE-EFFICIENT MANNER

(75) Inventor: Andrew M. Rudoff, Boulder, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 496 days.

(21) Appl. No.: 10/618,135

(22) Filed: Jul. 11, 2003

(65) Prior Publication Data

US 2004/0107225 A1    Jun. 3, 2004

Related U.S. Application Data

(62) Division of application No. 09/764,168, filed on Jan. 16, 2001, now Pat. No. 6,636,878.

(51) Int. Cl.
G06F 17/30  (2006.01)

(52) U.S. Cl. .................. 707/204; 707/104.1; 707/100; 707/10

(58) Field of Classification Search ................ 707/204, 707/100, 1, 10, 104.1
See application file for complete search history.

(56) References Cited

U.S. PATENT DOCUMENTS

| 5,813,017 | A | 9/1998 | Morris |
| 5,819,292 | A | 10/1998 | Hitz et al. |
| 6,269,431 | B1 | 7/2001 | Dunham |
| 6,341,341 | B1 | 1/2002 | Grummon et al. |
| 6,389,423 | B1 | 5/2002 | Sakakura |
| 6,460,054 | B1 | 10/2002 | Grummon |
| 6,473,775 | B1 | 10/2002 | Kusters et al. |
| 6,539,381 | B1 | 3/2003 | Prasad et al. |
| 6,553,391 | B1 * | 4/2003 | Goldring et al. ............ 707/203 |

OTHER PUBLICATIONS

Network Appliance Technical Report 3002 (Rev. C 3/95), entitled "File System Design for an NFS File Server Appliance", by Dave Hitz, et al., dated Jan. 19, 1994.

* cited by examiner

Primary Examiner—Mohammad Ali
Assistant Examiner—Leon J. Harper
(74) Attorney, Agent, or Firm—Hickman Palermo Truong & Becker LLP (57) ABSTRACT

A mechanism for replicating and maintaining files in a space-efficient manner is disclosed. In one embodiment, a current file is replicated by associating the data blocks of the current file with both the current file and a new file. The new file and the current files are separate and distinct from each other. Data blocks remain shared until the content of one file is modified. Only the data blocks affected by the modification are duplicated. The two files share the unchanged data blocks, but both files are each associated with additional data blocks that reflect the modification. Reference values are used to track how many files are associated with each data block. In another embodiment, a file descriptor is linked to a filename at the request of a user or application. The present invention avoids needless duplication of the same data blocks among copies of a file.

12 Claims, 8 Drawing Sheets

MECHANISM FOR REPLICATING AND MAINTAINING FILES IN A SPACE-EFFICIENT MANNER

This application is a divisional of U.S. patent application Ser. No. 09/764,168, entitled MECHANISM FOR REPLICATING AND MAINTAINING FILES IN A SPACE-EFFICIENT MANNER, filed on Jan. 16, 2001 now U.S. Pat. No. 6,636,878.

FIELD OF THE INVENTION

This invention relates generally to computer systems, and more particularly to a mechanism for replicating and maintaining files in a space-efficient manner.

BACKGROUND

In a computer system, files are used for many purposes, such as to organize information, to store data, or to contain applications or a list of commands. The term "file" as used herein refers broadly to any logical entity that can be accessed, used or manipulated as a container by entities such as system users, applications, and other resources. While a file can be associated with several properties, including but not limited to, a filename, a file descriptor, and a set of blocks that contain the contents or data of the file, it should be noted that these are just properties of the file and not the file itself. Put another way, the properties are just manifestations of the file, while the file itself is the logical entity that is being manipulated.

When a file is copied on a computer system, a duplicate of the file is created. The duplicate typically has a different file name, but initially it will have the same contents as the original. The contents of the duplicate file are stored on previously unused space in the computer system. For example, if a file on a computer hard drive with a size of 1 megabyte is copied to a new file, the latter will occupy an additional 1 megabyte of storage space on the hard drive.

Replicating large files can result in an inefficient use of system resources. For example, when a copy of a file is later modified, only a small portion of the contents of the copy may differ from the original. However, because both the original and the copy occupy their own space on the system, much of the space occupied by the copy is needlessly duplicated.

For example, consider a large word processing file. The author of the document may want to save different versions as it is being written or edited, but most of the contents of the file may remain exactly the same. As new versions are created and modified, only the data blocks for each version that are associated with the modified content will be changed, leaving unmodified the remainder of the data blocks for the file. As a result, most of the data storage blocks associated with the different versions of the file are exactly the same, yet for each separate version of the file, a separate copy of each of those unchanged data blocks will exist. As the size of the file increases and/or the number of copies increases, the number of duplicated data blocks increases, resulting in an inefficient use of the system's storage capacity.

Note that it is important to distinguish copying a file from another form of file manipulation called linking. A link can be created between two file names such that both names refer to the same file. For example, in the Unix operating system, the link command can be used to associate a new file name with an existing file name and the contents of that existing file. The result is that there is still only one set of data blocks (or content), but now the file can be referred to by both the original and new file name. If the content of the file is changed, then that change is reflected in the file regardless of which linked file name is used to refer to the file. Thus, linking is different from copying in that copying creates multiple, independent files, whereas with linking there is only one file that has multiple names instead of two distinct files.

One approach for creating copies of data without duplicating the information that remains the same between the original data and a copy of that data is the "copy-on-write" (C-O-W) technique. The basic idea of copy-on-write is that an original and a copy share the portions of the data that remain the same between the original and the copy. As data is changed in either the original or the copy, new data portions are created to reflect the changes, and such data portions are now specific to the original or the copy. However, data portions that remain the same between the original and the copy continue to be shared.

For example, some versions of the Unix operating system, such as Solaris by Sun Microsystems and Mach by Carnegie Mellon University, utilize copy-on-write memory. With this approach, two processes can share memory blocks in the computer system's memory until one process writes to a particular memory block. At that point, the process that writes to the particular memory block gets its own private copy of that memory block, and the original memory block is no longer shared between the two processes.

Figure 1A:
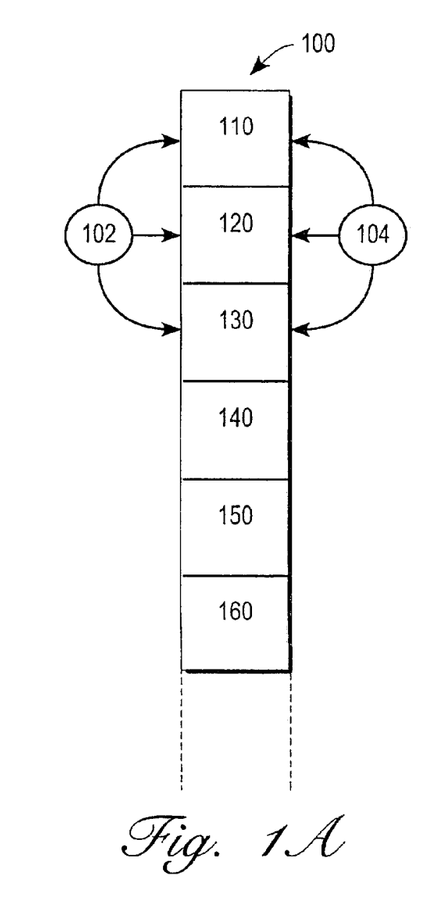
FIG. 1A is a block diagram that illustrates two processes that are associated with the same memory blocks.
Figure 1B:
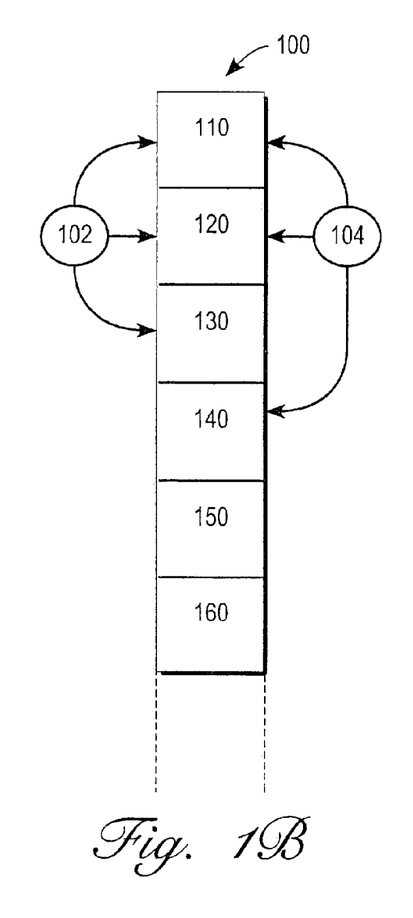
FIG. 1B is a block diagram that illustrates two processes that share some common memory blocks but not another uncommon memory block.
Figure 1C:
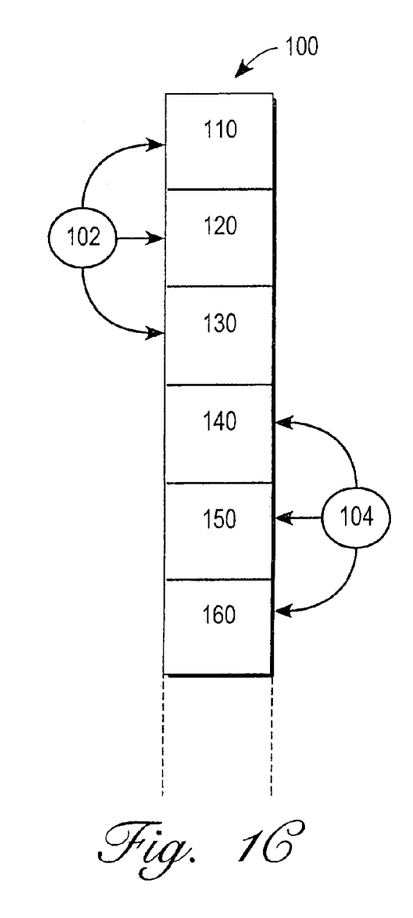
FIG. 1C is a block diagram that illustrates two processes that do not share common memory blocks.

FIGS. 1A, 1B, and 1C provide a simple illustration of the sharing of memory blocks between two processes. The system illustrated in FIGS. 1A and 1B has a memory 100 that is comprised of a plurality of memory blocks that store data or information. For purposes of explanation, only memory blocks 110, 120, 130, 140, 150, and 160 are shown. In FIG. 1A, memory blocks 110, 120, and 130 are associated with a process 102. Also in FIG. 1A, memory blocks 110, 120, and 130 are associated with a process 104, which initially is using the same information as process 102.

If process 104 then makes a change to some of the information that is stored in memory block 130, the information in memory block 130 is copied to an unused memory block, such as memory block 140. Then memory block 140 is modified to reflect the change in the information.

FIG. 1B shows the result of this change. Process 104 is now associated with memory blocks 110, 120, and 140, but process 104 is no longer associated with memory block 130. Meanwhile, process 102 remains associated with memory blocks 110, 120, and 130. Thus, in FIG. 1B, memory blocks 110 and 120 are shared by processes 102 and 104, since both those processes are using the same information stored in those memory blocks. However, because the information in memory block 130 that was originally shared by processes 102 and 104 is now different for the two processes, process 102 remains associated with memory block 130 while process 104 is now associated with memory block 140.

FIG. 1C shows what would happen if no sharing of the memory blocks by the processes were allowed. In this case, process 102 is associated with memory blocks 110, 120, and 130 while process 104 is associated with memory blocks 140, 150, and 160. After the change in the information in memory blocks 130 and 160 between the two processes, the contents of memory block 130 and memory block 160 will be different. The contents of memory blocks 110 and 140 remain the same, and similarly the contents of memory blocks 120 and 150 remain the same. Thus, if memory blocks are not shared, the system will be storing exact duplicates of the contents of memory blocks 110 and 120 in memory blocks 140 and 150, respectively, which is an inefficient use of the system's memory capacity.

Another implementation of copy-on-write can be found in some file systems that use "snapshots" to provide a backup feature to allow users to retrieve older versions of a file. For example, Network Appliance offers a file system called "write anywhere file layout" (WAFL), and the Veritas file system (VxFS) contains a similar feature. With this type of backup feature, a snapshot is taken of the entire file system at a given point in time, effectively freezing the state of the files at that moment. Later after the snapshot is taken, if any changes are made to the files on the file system, then new data blocks are created and modified to reflect the changes to the contents of each of the changed files. This means that as files are changed following the snapshot, new data blocks are used to reflect changes in the contents of the files, but unchanged data blocks continue to be shared between the snapshot and the current working versions of the files.

With this backup approach, any current versions (or working versions) of the files being used following the snapshot are just newer versions, not copies, of the original files that were frozen at the time of the snapshot. In other words, the current version is not separate from original frozen version. Instead, the current version reflects changes to the original version since the point at which it was frozen by taking the snapshot.

This backup feature allows the user to retrieve an earlier version of a file as that file existed at the time of the snapshot. For example, if a user deletes a file or if the user changes a file and later wants to return to an earlier version, the user can retrieve the version of that file at the time of the snapshot by accessing this backup feature of the file system. While this type of backup feature can be helpful in minimizing storage required for backups, it is limited in that it only applies to backups and it is only implemented for the entire file system.

Based on the foregoing, there exists a need for a mechanism for replicating an individual file or group of selected files on a computer system that minimizes the storage space required when there are portions of the original file and the copy that remain the same.

SUMMARY OF THE INVENTION

To overcome the shortcomings of the prior art, the present invention provides a mechanism for more efficiently replicating and maintaining files in a space efficient manner by using the copy-on-write approach. Based at least partially on the observation that the stored data for an original file and a copy of that original file will initially be the same, the present invention associates the same stored data with both files. In one embodiment, a current file is replicated to create a new file by associating the data blocks of the current file with both the current file and the new file. Even though the new file and the current file share the same data blocks, the new file and the current files are both separate and distinct from each other. The data blocks remain shared until the content of one of the files is modified. Only the data blocks affected by the modification are duplicated. After the modification, the two files continue to share the unchanged data blocks, but both files are each associated with additional data blocks that reflect the differences in content between the two files. Reference values are used to track how many files are associated with each data block. In another embodiment, a file descriptor is linked to a filename at the request of a user or application. By avoiding the needless duplication of the same data blocks among copies of a file, the present invention eliminates the waste of system resources that results from the copying approaches of the prior art. Thus, the present invention provides an improved mechanism for replicating and maintaining files in a space-efficient manner.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENT(S)

A mechanism for replicating and maintaining files in a space-efficient manner using the copy-on-write approach is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In the following description, the various functions shall be discussed under topic headings that appear in the following order:

I. FUNCTIONAL OVERVIEW
II. PROCESS OVERVIEW
III. REPLICATING FILES USING "COPY-ON-WRITE"
IV. MAINTAINING "COPY-ON-WRITE" FILES
V. TRACKING SHARED DATA BLOCKS
VI. MODIFYING A FILE
VII. APPLICATION PROGRAM INTERFACE
VIII. HARDWARE OVERVIEW

I. Functional Overview

Figure 2A:
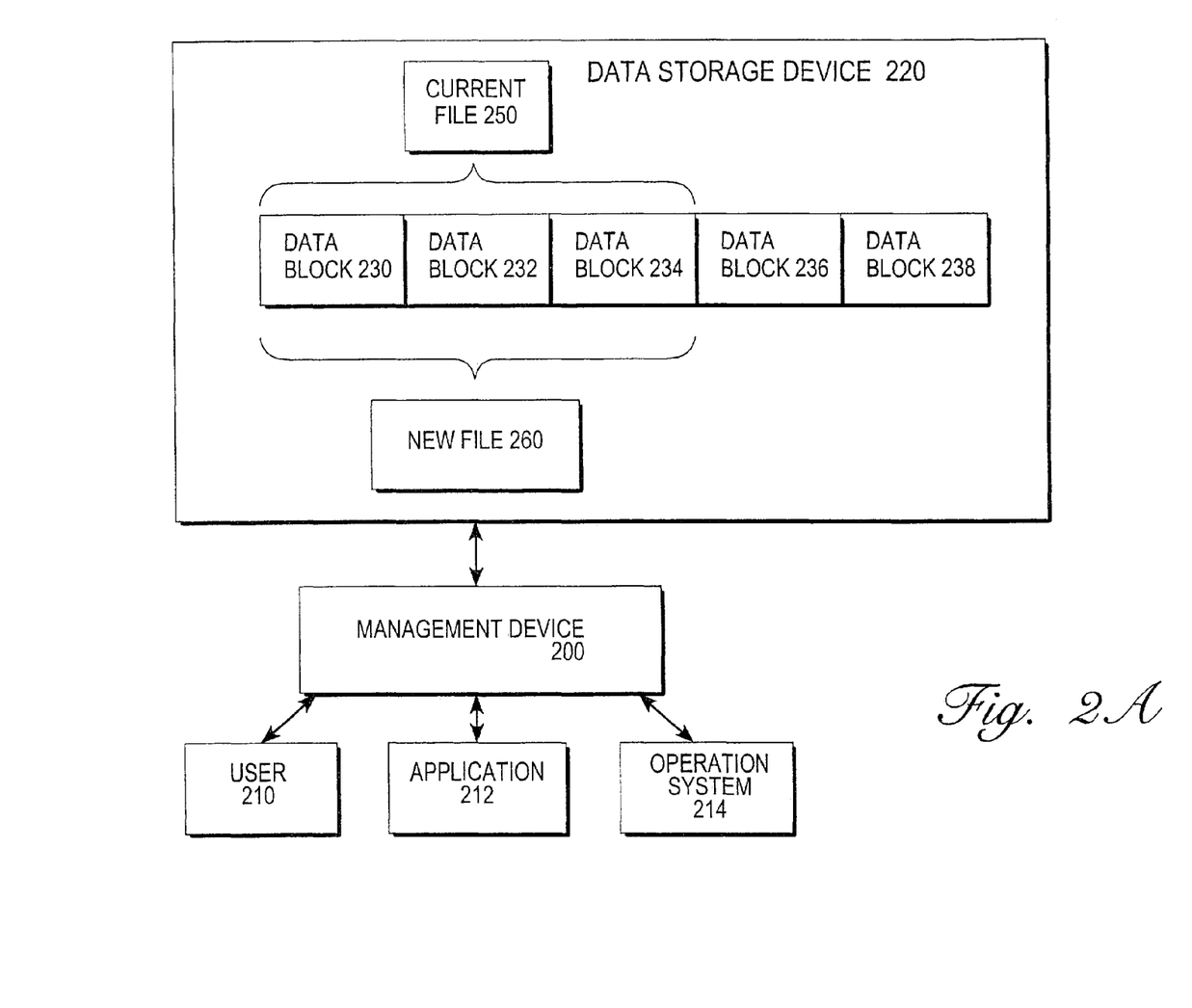
FIG. 2A is a logical block diagram that illustrates a high level overview of one embodiment of a mechanism for replicating and maintaining files in a space-efficient manner before a replicated file is modified.
Figure 2B:
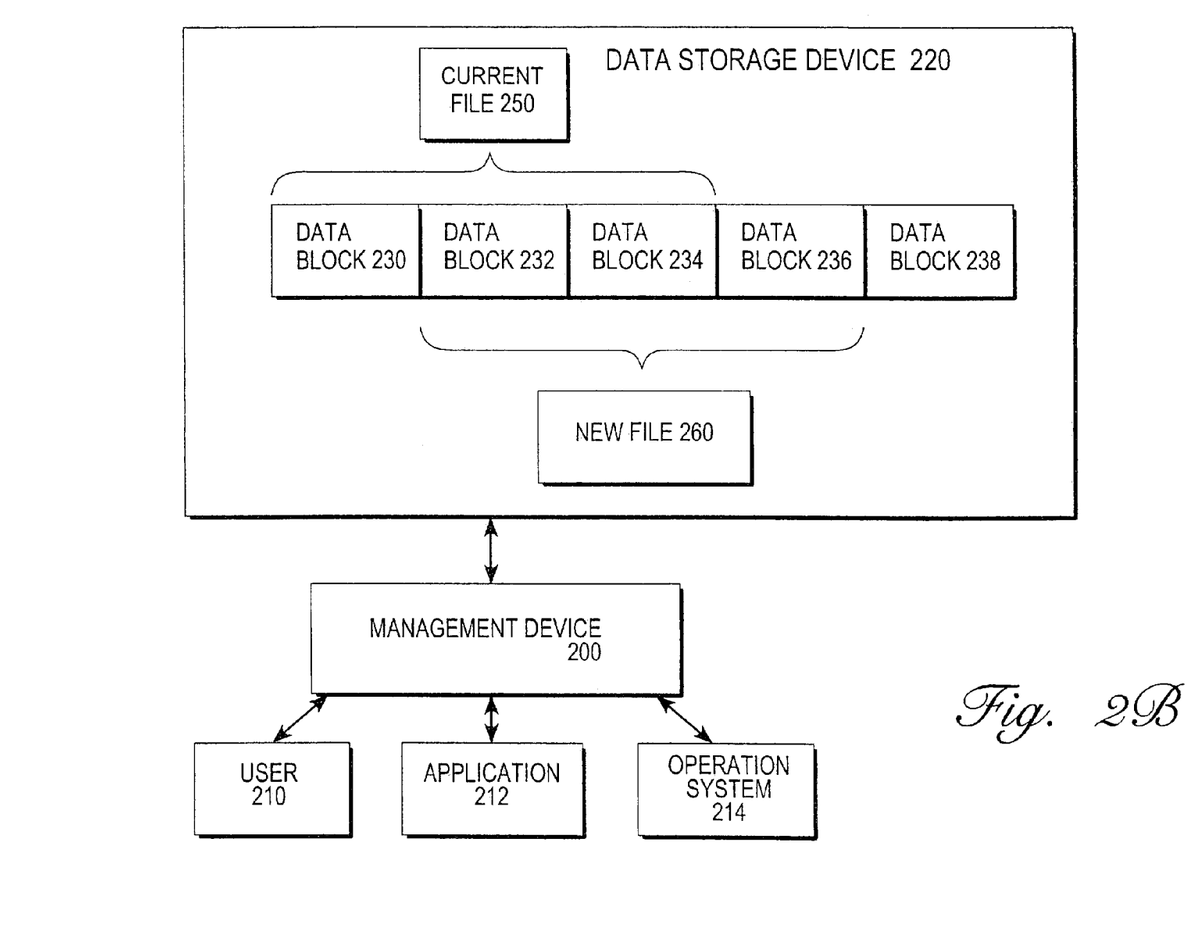
FIG. 2B is a logical block diagram that illustrates a high level overview of one embodiment of a mechanism for replicating and maintaining files in a space-efficient manner after a replicated file is modified.

FIG. 2 is a logical block diagram that illustrates a high level overview of one embodiment of a mechanism for replicating and maintaining files in a space-efficient manner. Specifically, FIG. 2A provides a logical overview before a replicated file is modified, while FIG. 2B provides a logical overview after a replicated file is modified.

In FIG. 2A, there is a management device 200 that is capable of communication with a variety of entities, such as a user 210, an application 212, and an operating system 214. In addition, management device 200 is connected to a data storage device 220. Data storage device 220 contains a plurality of data storage blocks, although for purposes of simplifying this example, FIG. 2A only shows data blocks 230, 232, 234, 236, and 238. Finally, FIG. 2A shows a current file 250 that contains information that is stored in data blocks 230, 232, and 234.

An entity can make a request to management device 200 to replicate a file. Assume for this example that user 210 requests that current file 250 be replicated. With a typical, normal file copying approach, management device 200 would create a copy of current file on data storage device 220 by duplicating data blocks 230, 232, and 234 into previously unused data blocks and associating the duplicated data blocks with the copy. However, in one embodiment, management device 200 will instead employ the copy-on-write technique to create a new file 260 and associate data blocks 230, 232, and 234 with new file 260. Thus, data blocks 230, 232, and 234 are associated with both current file 250 and new file 260. Current file 250 and new file 260 may be referred to as C-O-W files because data blocks 230, 232, and 234 are being shared via the copy-on-write technique. Note that while current file 250 and new file 260 are associated with the same data blocks, current file 250 and new file 260 are separate and distinct and therefore can be manipulated independently of each other, as discussed further below. The approach of this embodiment is a more space-efficient manner of copying because the same information is not needlessly duplicated in additional data storage blocks.

Referring now to FIG. 2B, an entity can make another request to management device 200 to modify either current file 250 or new file 260. For this example, assume that application 212 requests that new file 260 be modified. Assume further that the modification only affects the data stored in data block 230, although in fact any number of the data blocks could be affected.

As a result of the modification request, the contents of data block 230 are copied to a new, unused data block, such as data block 236, and then modified. New file 260 is then associated with data block 236 and de-associated with data block 230. Therefore, new file 260 is now associated with data blocks 232, 234, and 236, while current file 250 is still associated with data blocks 230, 232, and 234.

After the modification, current file 250 and new file 260 share data blocks 232 and 234, but current file 250 is the only file in this example that is associated with data block 230 and new file 260 is the only file in this example that is associated with data block 236. This example illustrates a more space-efficient manner of copying because only those data blocks in which the information is different between the C-O-W files as a result of a modification are duplicated.

II. Process Overview

Figure 3:
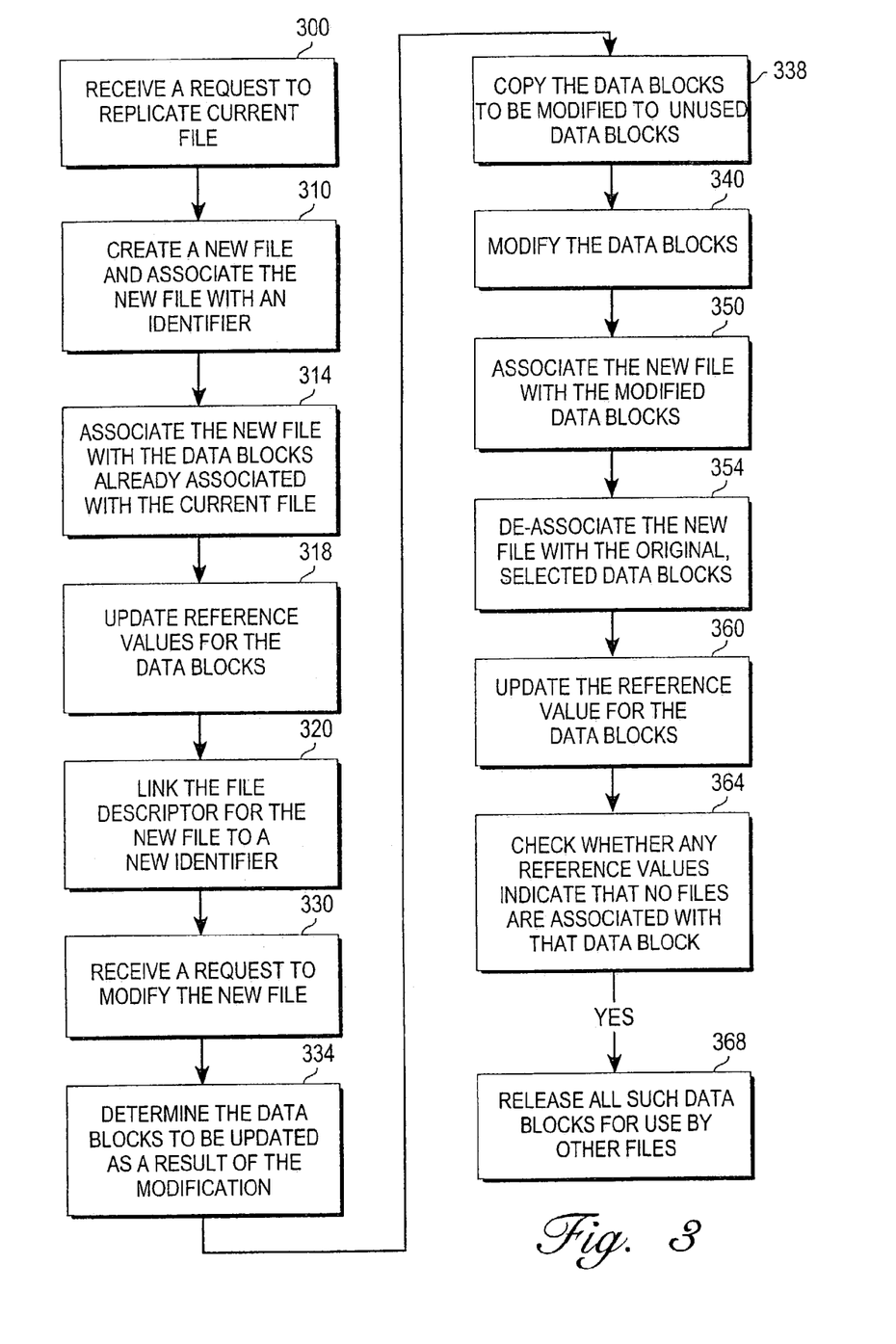
FIG. 3 is a flowchart that illustrates a high level overview of one embodiment of a mechanism for replicating and maintaining files in a space-efficient manner.

FIG. 3 is a flowchart that illustrates a high level overview of one embodiment of a mechanism for replicating and maintaining files in a space-efficient manner. In block 300, a request is received to replicate a current file that is associated with a plurality of data blocks. The request may come from a variety of entities, such as a user, an application, or an operating system.

In response to the request, block 310 creates a new file and associates the new file with an identifier that may be used to refer to the new file. In block 314, the new file is associated with the data blocks that are already associated with the current file. As a result, both the current file and the new file are associated with the same data blocks, yet the current file and the new file are separate and distinct files that can be manipulated independently of one another.

In block 318, reference values for each data block are updated to reflect that both the current file and the new file refer to those data blocks. For example, the reference value for each of the plurality of the data blocks may have originally been "1" because only the current file was associated with those data blocks. However, after the replication of the current file to create the new file, the reference values are changed to "2" because both the current file and the new file are associated with those data blocks.

In block 320, a new identifier for the new file is linked to the original identifier that was associated with the new file in block 310. For example, the file identifier that was associated with the new file in block 310 may be a file descriptor, and the new identifier that is linked here in block 320 may be a new file name.

In block 330, a request to modify the new file is received. Note that while this example has the new file being modified, the current file could be selected for modification. In response to the request to modify the new file, block 334 determines the data blocks that need to be updated to reflect the requested modification of the new file. Then in block 338 those data blocks are copied to previously unused data blocks.

Next, in block 340, the data blocks that were copied to previously unused data blocks are updated (or modified) to reflect the modification. Then the new file is associated with the modified data blocks in block 350. In addition, in block 354, the new file is de-associated with the selected data blocks that were copied into the previously unused data blocks.

Finally, the reference value for both the current file and the new file are updated in block 360. For example, for the copied data blocks, the reference values are updated to reflect that only the current file is associated with the copied data blocks and only the new file is associated with the updated/modified data blocks. In addition, in block 364 a check is made to see if any reference values have dropped to "0," indicating that no files are associated with those data blocks. If so, then those data blocks are released for use by other files in block 368.

It will be appreciated that the high level overview described above presents just one example of a mechanism for replicating and maintaining files in a space-efficient manner. Not all of the features outlined above are necessary for a given embodiment, and in fact some embodiments may contain only a few of the features described, as discussed in more detail below.

III. Replicating Files Using "Copy-On-Write"

The copy-on-write approach can be utilized to replicate or copy files more efficiently than the normal copying of files discussed previously. Several embodiments are described in which the copy-on-write approach is implemented so that computing system resources are used more efficiently by avoiding the duplication of data blocks that are the same between files that are replicated or copied from one another.

To understand the use of copy-on-write for replicating files, it is helpful to first understand how a normal copy (or a replica/duplicate) of a file is made and how data blocks are associated with the original and the copy. For example, in the Unix operating system, the copy command or program "cp" performs several system calls when copying an existing FILE-A to a new FILE-B. Such a command or program with its associated system calls can be described as follows:

```
open A for reading a file
open B for creating a file
loop
    read data block from A
    write data block to B
```

The first "open" system call prepares FILE-A to be read. The second "open" system call creates a new FILE-B. The "loop" then reads a data block from FILE-A and then writes that data block to FILE-B. This read/write operation loops (or is repeated) until all the blocks from A have been copied to B. The final result of this copy command is that there are two files, each with its own file name and each with its own set of data blocks.

A file typically has associated with it certain parameters and characteristics. For example, in an operating system such as Unix, a file may have associated with it "metadata," and that metadata may include a "block list." The block list can be used to list the data blocks on a storage device or medium that are associated with that file. For example, if FILE-A is associated with data blocks 1, 2, and 3 on the storage device, FILE-B (which is a copy of A) could be associated with 3 other data blocks, such as data blocks 4, 5, and 6. Other operating systems also have mechanisms for associating files with their data blocks. For example, in an operating system such as DOS, there may be a file allocation table that specifies which data blocks are associated with which files.

In one embodiment, a modified version of the copy command or program is expressed as follows:
    open B as a C-O-W of A Here, there is only one system call instead of multiple system calls, such as in the typical approach described above for Unix. Also, in place of copying each block from FILE-A to new blocks associated with FILE-B, the new FILE-B is instead associated with the same data blocks as FILE-A. Therefore, in an operating system like Unix, if the metadata associated with FILE-A has a block list that specified that FILE-A is contained in data blocks 1, 2, and 3, then the metadata associated with FILE-B would have a block list that also specified that FILE-B is associated with data blocks 1, 2, and 3.

Note that in this embodiment, there are in fact two independent and distinct files, each with its own parameters and characteristics, such as their own name, metadata, etc. This is unlike the link command discussed previously, in which one file can be referred to by two names. Thus, despite having two names as a result of the link command, there are not two distinct files since both names refer to the same file. In the example referred to above, FILE-A and FILE-B happen to have the same data blocks specified in their block list. However, while FILE-A and FILE-B share those data blocks, FILE-A and FILE-B are distinct from each other and therefore can be manipulated independently of each other. Because of this sharing via the copy-on-write approach, FILE-A and FILE-B can be referred to as C-O-W files or FILE-B can be said to be a C-O-W of FILE-A.

Also note that as used herein, the word "distinct" as it relates to files means that the files can be treated as distinct logical entities such that changing one file does not change the other file. However, describing two C-O-W files as being distinct does not preclude them from sharing common data blocks. Even if common data blocks are shared, those two C-O-W files are distinct logical entities that can be manipulated independently of each other. As described above, if a change is made to one C-O-W file, then the necessary data blocks are copied and updated to reflect that change. Such a change will not be reflected in the other C-O-W file. This is in contrast to the link command discussed previously in which two filenames are associated with the same file, such that a change made using one filename will be reflected in the file when it is accessed using the other filename. Thus, C-O-W files are distinct whereas a file that has two filenames associated with it via a link command is not a pair of distinct files.

In another embodiment, a modified version of the copy command or program can include an indicator that a C-O-W file is to be created upon execution of an open system call. However, to understand the creation of such an indicator, it is necessary to first review how existing indicators are used.

For example, in Unix, a generic open system call can have three arguments: filename, flags, and mode/permissions for the file. This can be expressed as follows:
    open (filename, flags, creation mode)

The filename specifies the name of the file to be opened by the system call. The flags may designate options about how the opening of the file is to be performed. The creation mode is used to specify the mode when the open causes a file to be created.

Examples of common flags and their meanings include the following:
    O_RDONLY—open the file as read only
    O_RDWR—open the file-as read/write
    O_CREAT—open/create a new file Multiple flags can be used together. For example, in Unix, the logical "OR" operator, denoted by "|", can be used to string together multiple flags. The following expression demonstrates the use of the logical "OR" operator:
    open ("FILE-A", O_CREAT|O_RDWR)

The result of this system call is the creation of a new file with the name FILE-A, which can be both read from and written to.

Finally, an identifier can be assigned to a file that is opened or created via an open system call. For example, in Unix, a file can be opened and assigned to a file descriptor, fd, as follows:
    fd=open ("FILE-A", O_CREAT|O_RDWR)

The result of this system call is the creation of the named file that is associated with the file descriptor, fd. Note that this file is not a persistent file, so that if the computer system experiences a crash, the data blocks associated with the file are automatically freed for use later by the system with other files.

In one embodiment, a new indicator is created to specify that a file is to be opened as a C-O-W file. For example, in Unix, a new flag can be created as follows:

O_SNAPSHOT—open the file as a C-O-W file

This flag can be used as in the following example:
open ("FILE-A", O_RDWR|O_SNAPSHOT)

The result of this system call is the opening of a C-O-W file that is a copy of FILE-A that can be both read from and written to.

It will be readily appreciated that such an indicator is not limited to the use of a flag like O_SNAPSHOT in the Unix example above. Any suitable flag or other indicator that is understood by the system to perform such an operation will suffice.

Similarly, a Unix file descriptor can be assigned to a C-O-W file via a system call as follows:
fd=open ("FILE-A", O_RDWR|O_SNAPSHOT)

The result of this system call is the opening of an unnamed C-O-W file that is associated with the file descriptor, fd. This unnamed C-O-W file is not a persistent file, so that if the computer system experiences a crash, the data blocks associated with the unnamed file are automatically freed for use by the system with other files.

The unnamed C-O-W file created above can be manipulated and modified just as an unnamed non-C-O-W file. The difference is that with the unnamed C-o-W file, no new data blocks are used unless and until the contents of the unnamed C-O-W file are changed. Until such changes are made, the unnamed C-o-W file shares the same data blocks as the original FILE-A as described above.

In another embodiment, an unnamed file associated with a file descriptor can be assigned a filename in response to a request from an entity, such as a user or an application. For example, in Unix, a system call can be used to associate a file descriptor with a specified file name. For example, the following system call may be implemented:

flink (int filefd, int directoryfd, char *newname)

where filefd is the file descriptor to be associated with the new name, directoryfd is the file descriptor for the directory where the new file is to be created. This system call may be applied as follows:

A system call, such as flink here, may be like a normal link command, except that flink allows for the linking of not just file names to a given file, but file descriptors as well. Thus, the file identified by fd can be linked to another filename, FILE-B, and then the now named file identified by fd can be closed.

The flink system call may be incorporated into an application, or computer program, by a programmer so that the flink system call is executed in response to a request from the application when the application is executed. Also, like a normal link command, the flink system call may be executed in response to a request from a user that wants to link a file descriptor to a file name.

In yet another embodiment, a new indicator is created to specify that an unnamed file is to be opened as a C-O-W file and then assigned a specified filename. This involves combining the features discussed above, so as to create a C-O-W file with the specified name. For example, in Unix, the following system calls can be used:

fd open ("FILE-A", O_RDWR|O_SNAPSHOT)
flink (fd, "FILE-B")

The result of these system calls is the creation of FILE-B, which is a C-O-W file of FILE-A. To be more precise, if FILE-A were originally not a C-O-W file, then both FILE-A and FILE-B are considered C-O-W files since both will share any common data blocks.

With this embodiment, the unnamed file cannot be accessed between the taking of the snapshot (e.g., opening the file with the open system call using the O_SNAPSHOT flag) and the closing of the unnamed file via the flink system call. Also, if the system experiences a crash prior to the flink system call, the file descriptor will be lost and all data blocks associated with that unnamed file automatically released for future use.

In another embodiment, a C-O-W file is created in response to a request. For example, in a version of Unix that has a modified copy command as discussed above, both a snapshot and a new file are created in response to a single request. This is in contrast to other systems (such as the backup approaches described previously) wherein a snapshot is taken at a particular time in response to a first request and then later a new file is created in response to a second request, such as a request to modify a previously frozen file. Also, in such a backup system, if the original frozen file is to be retrieved and modified, another request must be made to retrieve that older version of the file. In contrast, for the embodiment being described here, both the newly created C-O-W file and the original C-O-W file can be modified directly after a single request.

A request to create a C-O-W file can pertain to more than one file such that a particular set or group of files is copied, thereby creating another set or group of C-O-W files that do not occupy additional data blocks until the files are modified. This is in contrast to normal file copying that would create additional, duplicate files that would occupy additional data blocks even if all of the contents remained the same. This embodiment allows for the implementation of copy-on-write on a per request basis for the specified file or files.

In yet another embodiment, the request to create a C-O-W file comes from a particular entity, which may include but is not limited to, a user, an application, a program or other command file, or an operating system. This can greatly increase the usefulness of copy-on-write files and result in much more efficient utilization of system resources.

In addition, the entity requesting the copy may not be aware that a C-O-W file is being created instead of a regular copy because the use of the copy-on-write technique is transparent to the user. Therefore, the entity need not be concerned with whether a C-O-W file was made or a regular copy. The ability to create and use copy-on-write files in a transparent manner by many types of entities, such as a user or application, allow the entities to efficiently use system resources for specified files without being aware of the underlying copy-on-write approach.

In another embodiment, a copy command will first attempt to create a C-O-W file. The attempt may fail, however, because of a lack of support for copy-on-write by the underlying file system or because the copy crosses between two file systems. If a failure occurs, the copy command will fall back to making a normal copy.

IV. Maintaining "Copy-On-Write" Files

When a particular file is replicated to create another C-O-W file, the two files initially share all of the same data blocks. However, as the contents of the files are changed, new data blocks are created. The new data blocks reflect the changes and are particular to the corresponding file being changed. Because of such changes, the contents of the C-O-W files will diverge. As a result, fewer of the data blocks will remain the same between them while more data blocks are used that are specific to a particular file. However, system resources are still being used more efficiently because there is no duplication of data blocks between the C-O-W files when those data blocks remain the same between the two files.

In one embodiment, when a change is made to the contents of a C-O-W file, the data block or data blocks containing data that is impacted by the change are identified. For example, in a freshly made C-O-W file, where all the data blocks between the original and the replica are still the same, those impacted data blocks will be shared data blocks. However, because of the changed content to one of the two C-O-W files, those data blocks can no longer be shared. As a result, the impacted data blocks are copied or stored on the storage medium into new, previously unused data blocks. Then the new data blocks are modified to reflect the change in the changed file's content. Those new data blocks that reflect the changed content are then no longer shared between the C-O-W files. Instead, they are only associated with the file that has the changed content. The original data blocks remain associated with the other C-O-W file.

Figure 4A:
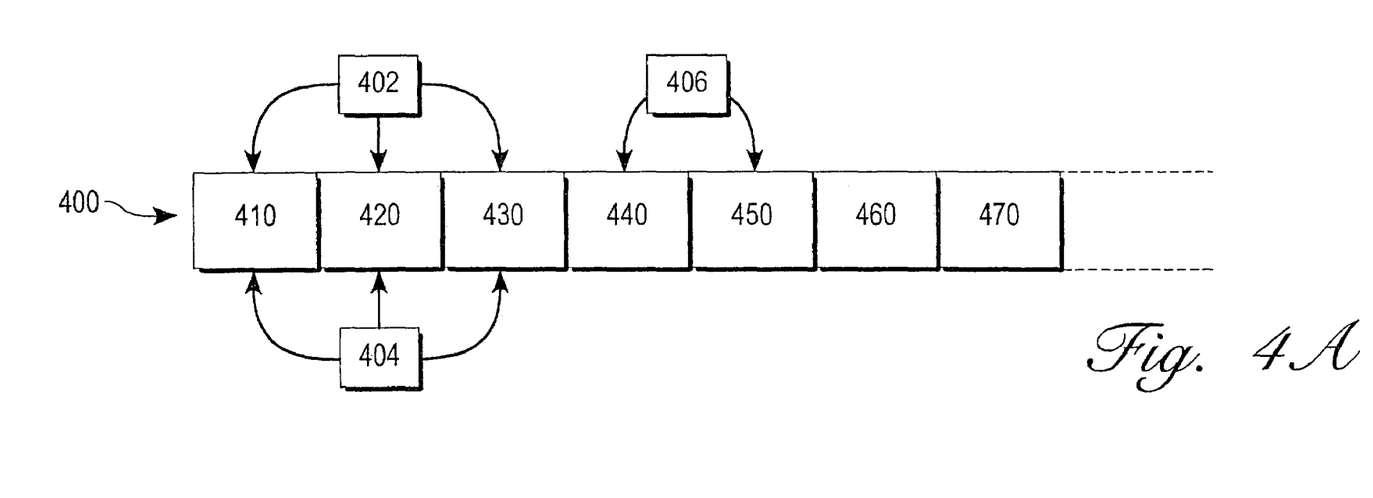
FIG. 4A is a block diagram that illustrates two C-O-W files that are associated with all of the same data blocks.
Figure 4B:
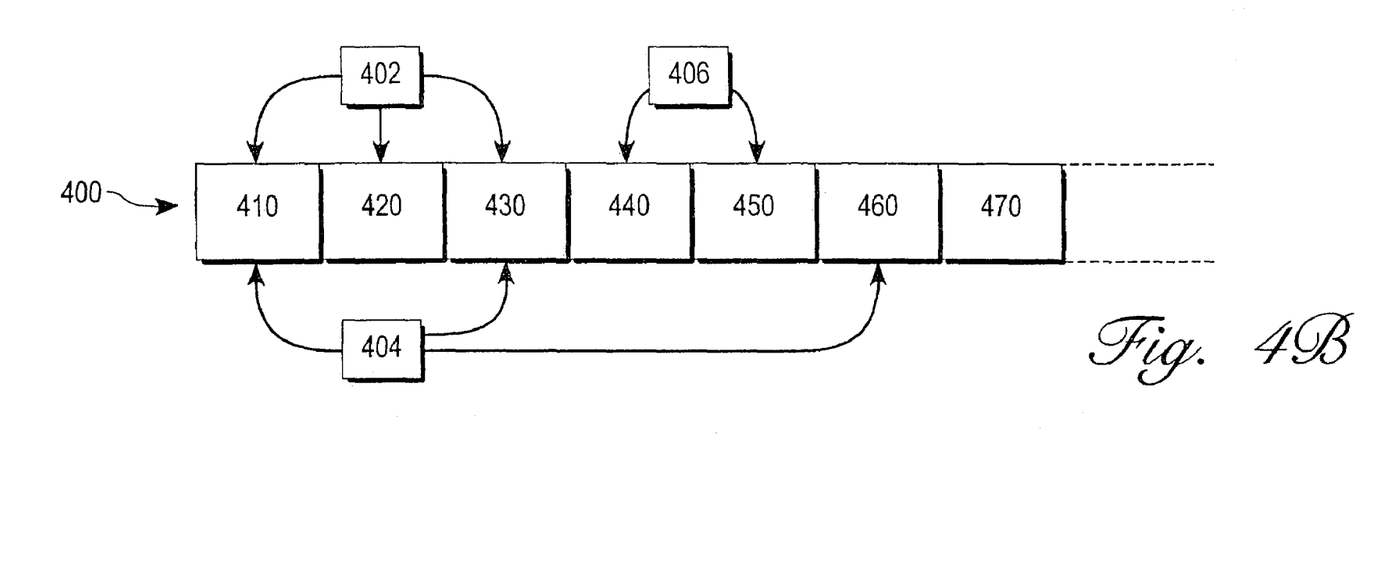
FIG. 4B is a block diagram that illustrates two C-O-W files that are associated with only some of the same data blocks.

For example, FIGS. 4A and 4B illustrate two C-O-W files in which the content of one C-O-W file is changed. In FIG. 4A, a storage medium 400 is comprised of a plurality of data blocks. For simplicity, only data blocks 410, 420, 430, 440, 450, 460, and 470 are shown. A file 402 is associated with data blocks 410, 420, and 430. A file 404, which is a freshly made C-O-W file of file 402, is also associated with data blocks 410, 420, and 430. A file 406 is associated with data blocks 440 and 450. Assume that for the example shown in FIG. 4A, file 406 is unrelated to files 402 and 404.

FIG. 4B illustrates what happens as a result of a change to the contents of file 404. In this example, assume that the change to the contents of file 404 impacts only data block 420. Because data block 420 is shared between file 402 and file 404, it cannot be changed to reflect the change in the content of file 404 without also impacting file 402. Therefore, data block 420 is copied into a previously unused data block 460, and the contents of data block 460 will be modified to reflect the change to the content of file 404.

Referring still to FIG. 4B, as a result of the change to the contents of file 404, file 404 is now associated with data blocks 410, 430, and 460. File 402 remains associated with data blocks 410, 420, and 430. Therefore, data blocks 410 and 430 are still shared between files 402 and 404. Now file 402 is the only file associated with data block 420 and file 404 is the only file associated with data block 460.

Figure 4C:
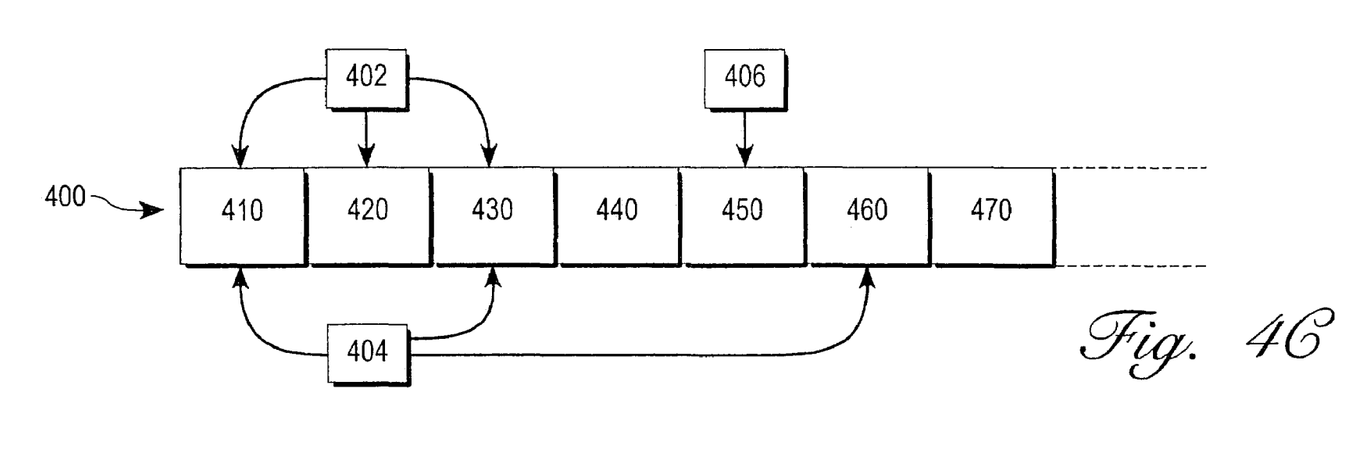
FIG. 4C is a block diagram that illustrates the release of a data block that is associated with a C-O-W file.

FIG. 4C illustrates what happens when a file no longer contains the data that was previously stored in a data block. In this example, the contents of file 406 have been modified such that a particular portion of information has been deleted such that the deleted information was previously all stored in data block 440. Because data block 440 is no longer needed for file 406, it is no longer associated with file 406. In an operating system such as Unix, this can be accomplished by removing data block 440 from the block list of file 406. Because no other files refer to data block 440, it is left as an unused block that can be utilized by other files on the system.

It will be appreciated that the general principles described above by the simple examples given can be readily extended to more complicated situations. For example, a given file can have a virtually unlimited number of data blocks instead of just 2 or 3 as shown above. Furthermore, changes to the contents of a file can impact many, most, or even all of the data blocks in a given file, instead of just one particular data block as shown above.

Furthermore, while the copying of a file via copy-on-write creates a new file that can be easily referred to as a C-O-W file, it will be appreciated that the original file is also a C-O-W file in the same manner as the newly created replica. The creation of a C-O-W file merely associates the data blocks common to two files with both files instead of needlessly duplicating those common data blocks. Either the newly created copy or the original file can be modified. Both can have changed data blocks written to previously unused data blocks, resulting in those modified data blocks no longer being shared between the two files. Thus, while it may be conceptually convenient to think of an original file and of a C-O-W file that is a replica of the original file, both files are properly described as C-O-W files and each C-O-W file can be said to be separate and distinct of the other. Following the copy operation, there is no significance when later using the files as to which was the original and which was the copy. Following the copying, both files will share those data blocks that they have in common, and both with have their own data blocks as a result of content changes to either of the two files.

It will also be appreciated that while the above examples focused on merely two files or three files referring to a shared data block, there is virtually no limit to the number of files that can share a data block or the order in which files are created via copy-on-write. Therefore, numerous files can refer to a particular shared data block. Also, an existing C-O-W file that shares data blocks with one or more other C-O-W files can later be copied via copy-on-write to create new C-O-W files that branch off that particular C-O-W file. Those newly created branch C-O-W files can share data blocks with both the particular C-O-W from which they are copied as well as prior C-O-W files from which that particular C-O-W file was copied.

Note that the embodiments and examples discussed above differ from the previously discussed backup approach in which copy-on-write is implemented to provide a backup feature in some file systems. Specifically, the use of the copy-on-write approach for backup purposes by taking a snapshot of the file system is hidden within the file system. Thus, it appears to the user that they are retrieving the older version of the file from an independent backup "copy." However, the user is actually reverting to an earlier version of the file that shares the same data blocks as the current working version for all those data blocks that remain the same between the two versions. Thus, in this backup approach, there is no copying being performed and the two versions are related, not separate. In fact, with this backup approach, if a request is made to copy/replicate a file, a new file will be created that duplicates all of the data blocks of the original and thus will take up as much storage space as the original. In contrast, in the embodiments and examples above, if a file is copied, an independent or separate file is created that just happens to share common data blocks with the copied file.

Another point to note with the backup approach is that once the original version is retrieved, it can be copied and used as a working version. However, the original version that is frozen at the time of the snapshot remains fixed and cannot be changed. Thus, the original and working versions of a file in this type of system remain related and are not separate files because the working version is a newer version of the frozen, original file. While this type of backup feature can be helpful in minimizing storage required for backups, it is limited in that it only applies to backups and it is only implemented for the entire file system. In contrast, in the embodiments and examples discussed above, C-O-W files can be used for any purpose and their use is not limited to implementations for an entire file system.

Note that as used herein, the use of the word "separate" in relation to files means that the files can be treated as completely separate logical entities with separate sets of properties, such as filenames, file descriptors, and data blocks. However, describing two C-O-W files as being separate does not preclude them from sharing common data blocks. Even if common data blocks are shared between two files, those two files are separate logical entities that can be manipulated separately and independently of each other. This is in contrast to the backup approach described previously in which there are merely two versions of the same file. Thus, with the backup approach, the frozen original file/version and the current file/version are not separate but rather are related because the former is always an older version of the latter.

In addition to more efficiently using storage capacity, C-O-W files can result in improved system performance in other areas, such as by minimizing unnecessary network traffic. For example, consider a network that links two geographically diverse locations, say Boulder, Colo. and Menlo Park, Calif. Some network operating systems, such as Solaris by Sun Corporation, allow a user who normally works in one location and whose files are stored locally at that location, such as Boulder, to access their files when working at another location, such as in Menlo Park. If that user is away from their home location and wants to copy a file at the home location to another file at the home location, the operating system will transfer the file from the server at the home location to the server at the user's present location and then transfer it back to the servers at the home location to create the new replica. For large files and diverse locations, such as Boulder and Menlo Park in this example, the transfer of such large files back and forth across the network can consume considerable resources.

The use of C-O-W files as described herein can eliminate all but a very minimal amount of network traffic in such a situation. Because the data blocks are not replicated when the C-O-W file is initially created, there is no need to transfer data back and forth between two diverse locations. Instead, the new file is created by associating it with the same data blocks as the original file, thus eliminating the need to transfer the file's content back and forth across the network.

Other performance improvements can also be realized by using C-O-W files. For example, because data blocks are shared and new data blocks only written as content is changed, there is no need to wait for a file to be copied. For large files, this can mean that a new C-O-W file can be created nearly instantaneously instead of having to wait an appreciable amount of time for the system to physically duplicate each and every data block of the original. Also, there is no need to use processing capacity to make such copies, thus freeing up the system's processor or processors for performing other tasks.

V. Tracking Shared Data Blocks

To share data blocks among C-O-W files, the shared data blocks are identified as "shared," and an indicator is used to keep track of how many C-O-W files are sharing a given data block.

In one embodiment, each data block has associated with it a "reference count" or "reference value." A reference value is an indicator of how many files are sharing or referring to a specific data block. For example, if only one file refers to a particular data block, that data block's reference value is "1". If two files refer to a particular data block, then that data block's reference value is "2". Similarly, as more files refer to a particular data block, that data block's reference value would change in a corresponding manner (e.g., increase in value for this particular example). If a data block is not used, then that data block's reference value would be "0".

Figure 5A:
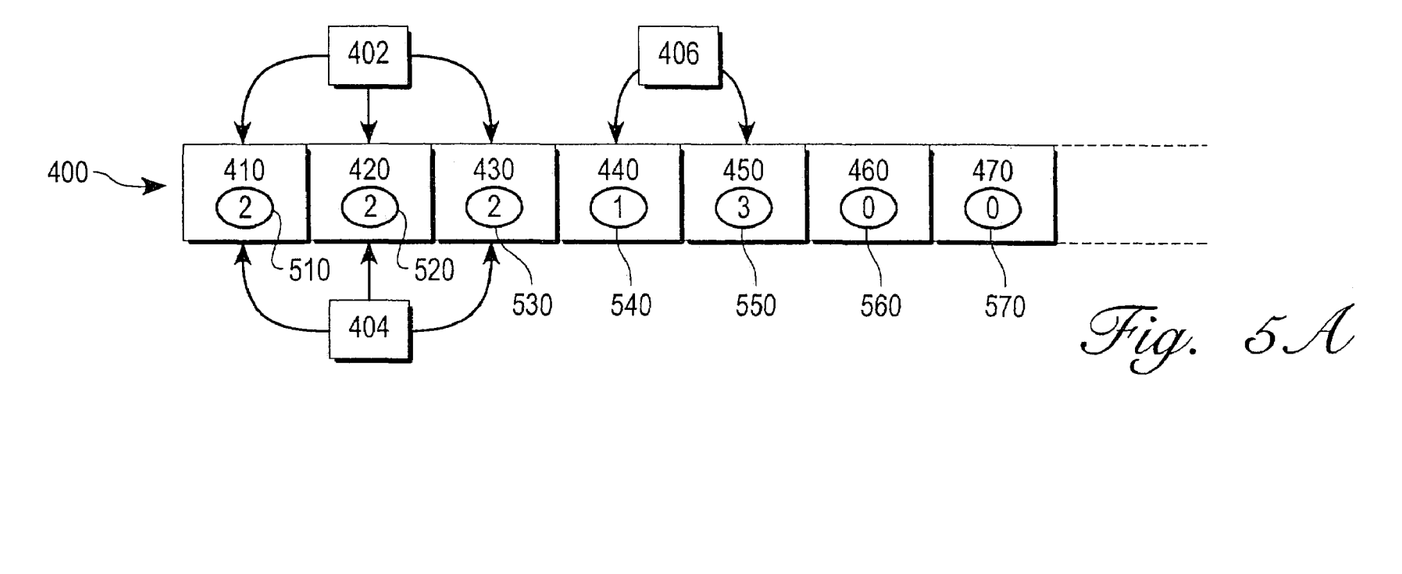
FIG. 5A is a block diagram that illustrates the reference values for two C-O-W files that are associated with all of the same data blocks.
Figure 5B:
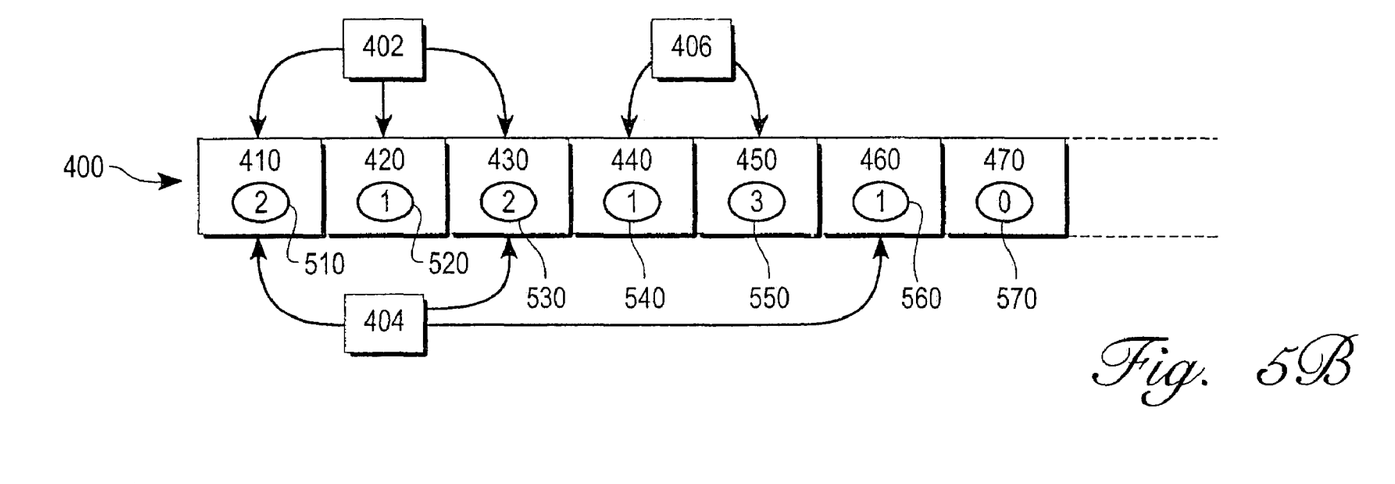
FIG. 5B is a block diagram that illustrates the reference values for two C-O-W files that are associated with only some of the same data blocks.

FIGS. 5A and 5B illustrate the reference values of two C-O-W files. FIG. 5A shows the reference values just after file 402 is copied to file 404. Data block 410 is associated with a reference value 510, which has a numerical value of "2". This indicates that data block 410 is shared by two C-O-W files. The same is true for data blocks 420 and 430 and their respective reference values 520 and 530. Data block 440 is associated with a reference value 540, which has a numerical value of "1". This indicates that data block 440 is only referred to by one file. Data block 450 is associated with a reference value 550, which has a numerical value of "3", which indicates that data block 450 is shared by three C-O-W files. To avoid confusion, the other two C-O-W files besides file 406 that share data block 450 are not shown. Finally data block 460 is associated with a reference value 560, which has a numerical value of "0." This indicates that data block 460 is not used by any file. The same is true for data block 470.

In FIG. 5B, the reference values reflect the changes resulting from a modification of the content of file 404 such that it now refers to data block 460 instead of data block 420. As a result, reference values 520 and 560 that are associated with data blocks 420 and 460, respectively, have changed from those in FIG. 5A. Here in FIG. 5B, reference value 520 for data block 420 has a numerical value of "1." This indicates that data block 420 is only being used by one file and thus is no longer being shared by files 402 and 404. In addition, reference value 560 now has an numerical value of "1", which indicates that data block 460 is no longer unused and now is referred to by one file, file 404.

Figure 5C:
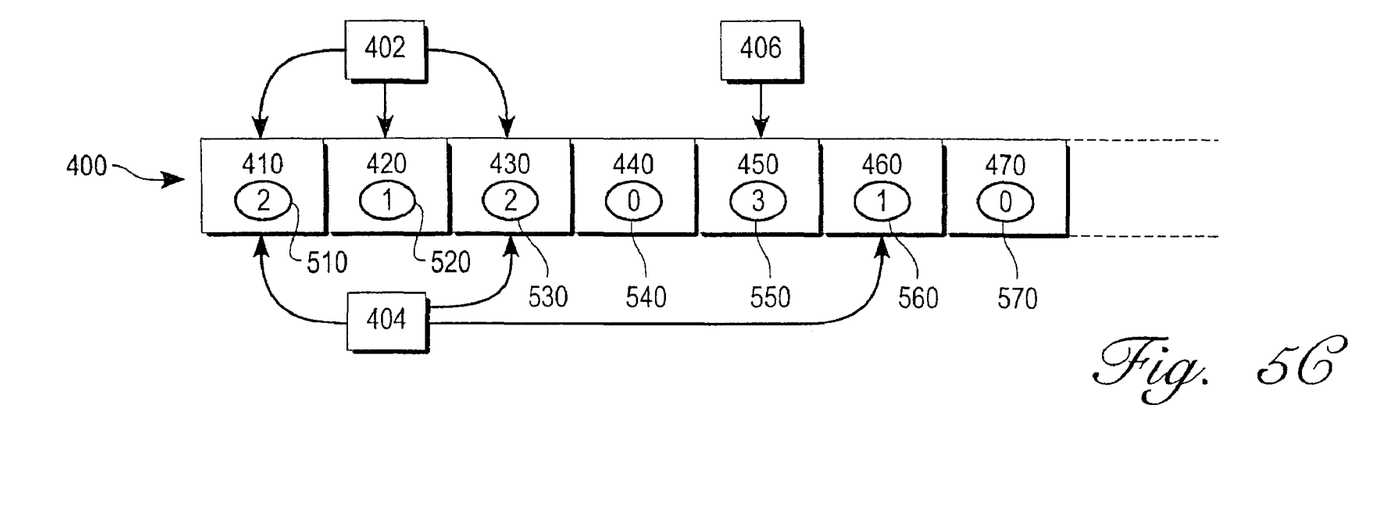
FIG. 5C is a block diagram that illustrates the reference values when a data block that was associated with a C-O-W file is released.

In FIG. 5C, the reference values reflect the change resulting from a modification of the contents of file 406 such that it no longer needs to refer to the data stored in data block 440. Here, reference value 540 has a numerical value of "0", indicating that it is no longer being used, little less shared, by any files. As a result, data block 440 is now available for use by another file.

It will be appreciated that this embodiment is not limited to the nomenclature of "reference values," numerical values, or reference counts that directly correspond to the number of files sharing a data block. Any type of indication can be used, so long as it is understood that a given number or symbol indicates how many files are sharing that data block. For example, the number of files sharing a data block could be indicated by a letter based code system, such as one in which A indicates that one file shares a data block, B indicates that two files share the data block, and so on.

In another embodiment, there is no tracking of which files refer to those data blocks in conjunction with the data blocks themselves. The reference value for a data block only reflects the number of files referring to that data block, and not which files out of all the files on the system that refer to that data block. For example, in a Unix based system, it is only within the block list of the metadata for each file that the relationship of that file to a particular data block is stored. There is nothing associated with the data blocks themselves that indicate to which files they belong.

VI. Modifying a File

Problems may arise when an entity modifies a file that is accessible by another entity (or entities). The term "entity" is used herein to anything that is capable of accessing a file, such as a user, a computer program, an application, or an operating system. When an entity is accessing the file while it is being modified, the entity may only see the changes made up to the point in time that the file is accessed. For example, a user of a file that is being modified may be unaware that an application is currently modifying the file. Thus, the user may be surprised later on when they learn that additional changes were made to the file by the application after the user accessed the file. Therefore, it would be beneficial if such a user saw either the original file or the modified file after all of the modifications were finished instead of running a risk of seeing an intermediate version of the file that only reflects some of the changes being made.

In one embodiment, a file to be modified or updated is copied to new file, which may be a normal file copy or which may be a C-O-W file, that is associated with a file descriptor, and then the new file is changed as necessary. Then the modified new file has the associated file descriptor linked to the name of the original file, thereby replacing the original file with the modified file. Alternatively, the file to be modified can be copied to a new file with a new name instead of a file descriptor, changed as necessary, and then the new file can be renamed with the original name of the file.

The entity accessing the file only sees the file under its original name and is unaware that the file is being modified. Therefore, if the original file is accessed at any time before the new file is renamed back to the original name of the file, only the original version will be accessed. This eliminates the problem during the modification process of having an intermediate version of the file accessed that reflects some but not all of the changes being made. In this embodiment, if the original file is accessed at any time after the new file is renamed to that name of the original, the version of the file accessed with reflect all of the changes that were made. If the new file is a C-O-W file instead of a normal copy of the file, system resources are conserved because the only data blocks that are duplicated are the data blocks that must be altered due to content changes in the original file.

Another feature of this embodiment for modifying files used by various users is that it can be implemented as part of the operating system. This eliminates the need to modify applications to preclude access to a file while it is being modified.

VII. Application Program Interface

An application program interface (API; also known as an application programming interface) is a mechanism whereby a programmer writing an application program may invoke the services of the operating system, another application, or other services. API's exist for windowing systems, file systems, database systems, and networking systems. For example, an API can define the functions used by an application program to perform tasks, including displaying information on a screen, accepting information for a file or document, and managing files on a computer system.

An API is distinguishable from direct user interfaces that define how the user interacts with the application or operating system. Examples of direct user interfaces include graphical user interfaces (GUI's) and command interfaces. For example, a GUI will define functions for managing icons, windows, pull down menus, and other aspects and components of the GUI.

In another embodiment, an application program interface (API) is used to allow access to the command or program that has implemented copy-on-write. For example, in the Unix operating system, the copy program "cp" can be modified as discussed above to include the capability of making C-O-W files, such as by a new system call such as:

open B as a C-O-W of A or such as by a new command flag, such as in:

open ("FILE-A", O_RDWR|O_SNAPSHOT)

The API of this embodiment allows an entity, such as a user or application program, to utilize copy-on-write whenever the entity makes a request to copy a file or files.

VIII. Hardware Overview

Figure 6:
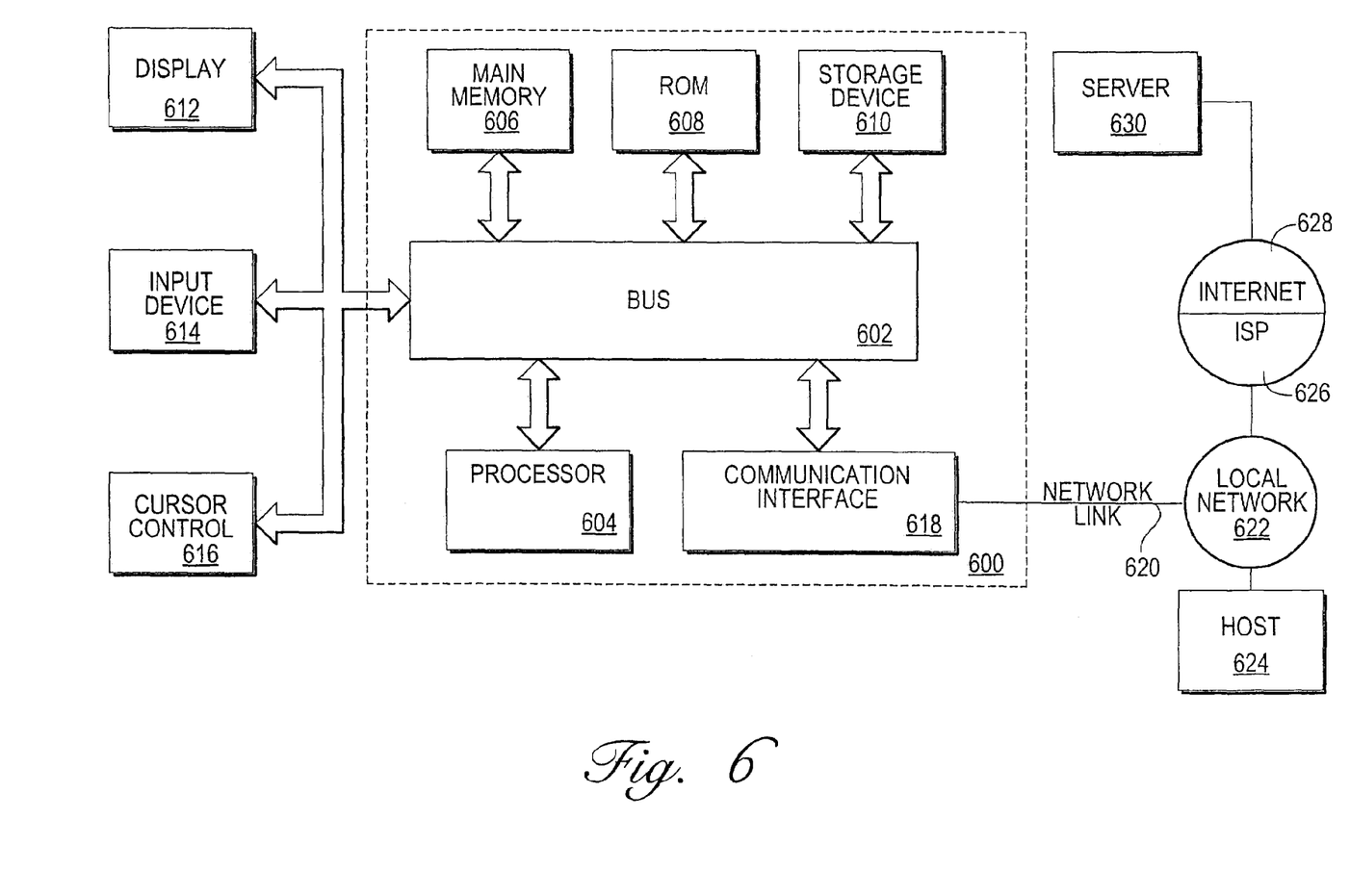
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for replicating and maintaining files in a space-efficient manner. According to one embodiment of the invention, replicating and maintaining files in a space-efficient manner is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for analyzing a Layer 2 path in a switched network as described herein.

The received code may be executed by processor 604 as it is received, and/or stored in storage device 610, or other non-volatile storage for later execution. In this manner, computer system 600 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for modifying a current file associated with a file name comprising:
   receiving a request to modify said current file;
   creating a new file, wherein said new file is a replica of said current file and wherein said new file is associated with a file descriptor;
   modifying said new file in response to said request to modify said current file, wherein said new file is only accessible by an entity that sent said request to modify said current file;
   linking said file descriptor to said file name, such that said new file replaces said current file;
   wherein:
   said current file is associated with a plurality of data blocks;
   based on creating said new file, said new file is associated with said plurality of data blocks such that both said current file and said new file are associated with said plurality of data blocks;
   modifying said new file in response to said request to modify said current file further comprises:
      associating at least one additional data block with said new file in place of at least one original data block of said plurality of data blocks, wherein:
         said at least one additional data block is not associated with said current file; and
         the content of said at least one additional data block is based on said request to modify said current file; and
      as a result of linking said file descriptor to said file name, said file descriptor is associated with said at least one additional data block and with said plurality of data blocks excluding said at least one original data block.

2. The method of claim 1, wherein, prior to linking said file descriptor to said file name, said current file continues to be capable of being accessed.

3. The method of claim 1, wherein:
   said file descriptor that is associated with said new file is a new file descriptor;
   said current file is associated with a current file descriptor; and
   linking said file descriptor to said file name, such that said new file replaces said current file, further comprises:
      linking said new file descriptor to said file name, such that said new file descriptor replaces said current file descriptor and said new file replaces said current file.

4. The method of claim 1, wherein an operating system receives the request to modify said current file, creates said new file, modifies said new file, and links said file descriptor to said file name.

5. An apparatus for modifying a current file associated with a file name comprising:
- a mechanism for receiving a request to modify said current file;
- a mechanism for creating a new file, wherein said new file is a replica of said current file and wherein said new file is associated with a file descriptor;
- a mechanism for modifying said new file in response to said request to modify said current file, wherein said new file is only accessible by an entity that sent said request to modify said current file;
- a mechanism for linking said file descriptor to said file name, such that said new file replaces said current file;

wherein:
- said current file is associated with a plurality of data blocks;
- based on creating said new file, said new file is associated with said plurality of data blocks such that both said current file and said new file are associated with said plurality of data blocks;
- the mechanism for modifying said new file in response to said request to modify said current file further comprises:
  - a mechanism for associating at least one additional data block with said new file in place of at least one original data block of said plurality of data blocks, wherein:
    - said at least one additional data block is not associated with said current file; and
    - the content of said at least one additional data block is based on said request to modify said current file; and
- as a result of linking said file descriptor to said file name, said file descriptor is associated with said at least one additional data block and with said plurality of data blocks excluding said at least one original data block.

6. The apparatus of claim 5, wherein, prior to linking said file descriptor to said file name, said current file continues to be capable of being accessed.

7. The apparatus of claim 5, wherein:
- said file descriptor that is associated with said new file is a new file descriptor;
- said current file is associated with a current file descriptor; and
- the mechanism for linking said file descriptor to said file name, such that said new file replaces said current file, further comprises:
  - a mechanism for linking said new file descriptor to said file name, such that said new file descriptor replaces said current file descriptor and said new file replaces said current file.

8. The apparatus of claim 5, wherein an operating system includes the mechanism for receiving the request to modify said current file, the mechanism for creating said new file, the mechanism for modifying said new file, and the mechanism for linking said file descriptor to said file name.

9. A computer-readable medium having stored thereon instructions which, when executed by one or more processors, cause the one or more processors to modify a current file associated with a file name, said computer-readable medium comprising:
- instructions for causing one or more processors to receive a request to modify said current file;
- instructions for causing one or more processors to create a new file, wherein said new file is a replica of said current file and wherein said new file is associated with a file descriptor;
- instructions for causing one or more processors to modify said new file in response to said request to modify said current file, wherein said new file is only accessible by an entity that sent said request to modify said current file;
- instructions for causing one or more processors to link said file descriptor to said file name, such that said new file replaces said current file;

wherein:
- said current file is associated with a plurality of data blocks;
- based on creating said new file, said new file is associated with said plurality of data blocks such that both said current file and said new file are associated with said plurality of data blocks;
- the instructions for modifying said new file in response to said request to modify said current file further comprises:
  - instructions for associating at least one additional data block with said new file in place of at least one original data block of said plurality of data blocks, wherein:
    - said at least one additional data block is not associated with said current file; and
    - the content of said at least one additional data block is based on said request to modify said current file; and
- as a result of linking said file descriptor to said file name, said file descriptor is associated with said at least one additional data block and with said plurality of data blocks excluding said at least one original data block.

10. The computer readable medium of claim 9, wherein, prior to causing one or more processors to link said file descriptor to said file name, said current file continues to be capable of being accessed.

11. The computer-readable medium of claim 9, wherein:
- said file descriptor that is associated with said new file is a new file descriptor;
- said current file is associated with a current file descriptor; and
- the instructions for linking said file descriptor to said file name, such that said new file replaces said current file, further comprises:
  - instructions for linking said new file descriptor to said file name, such that said new file descriptor replaces said current file descriptor and said new file replaces said current file.

12. The computer-readable medium of claim 9, wherein an operating system includes the instructions for receiving the request to modify said current file, the instructions for creating said new file, the instructions for modifying said new file, and the instructions for linking said file descriptor to said file name.

* * * * *